Feb. 16, 1960  J. G. SCHABERG  2,925,569

COMBINED TORQUER AND PICK-OFF

Filed Sept. 6, 1956  2 Sheets-Sheet 1

INVENTOR.
JOHANNES G. SCHABERG

BY
Joseph E. Ryan
ATTORNEY

INVENTOR.
JOHANNES G. SCHABERG
BY Joseph E. Ryan
ATTORNEY

United States Patent Office 2,925,569
Patented Feb. 16, 1960

2,925,569

COMBINED TORQUER AND PICK-OFF

Johannes G. Schaberg, St. Paul, Minn., assignor to Minneapolis-Honeywell Regulator Company, Minneapolis, Minn., a corporation of Delaware Application September 6, 1956, Serial No. 608,307

5 Claims. (Cl. 336—40)

This invention relates to a torquer and error signal pick-off, and more specifically discloses a combined unit wherein the coils for both units are mounted on a balanced support.

In the past, torquers and error signal pick-off units were developed where the units had a common axis but were placed at opposite ends of an associated device, such as a gyroscope. With this type of an arrangement, the overall length of the gyroscope was excessive and much space was wasted. In an effort to reduce the length of the unit, the torquer and pick-off were placed in the same plane at one end of the gyroscope and the units were inter-related by a rotatable bar or arm. While this arrangement serves to reduce the length of the unit and cut down on the wasted space, the use of a connecting bar was found to introduce unbalance and errors due to variations in expansion and contraction with changes in temperature.

It is an object of this invention to disclose an improved, combined torquer and signal pick-off for gyroscopes and other devices, wherein the rotating member is balanced.

It is a further object to disclose an improved combination where any variation in temperature causes substantially equal expansion of all sections of the connecting means and thereby retains complete balance.

Still a further object is to disclose an improved torquer and pick-off that is more compact and easily built.

These and other objects will become apparent when the attached drawings are considered in connection with the following disclosure, wherein.

Figure 1:
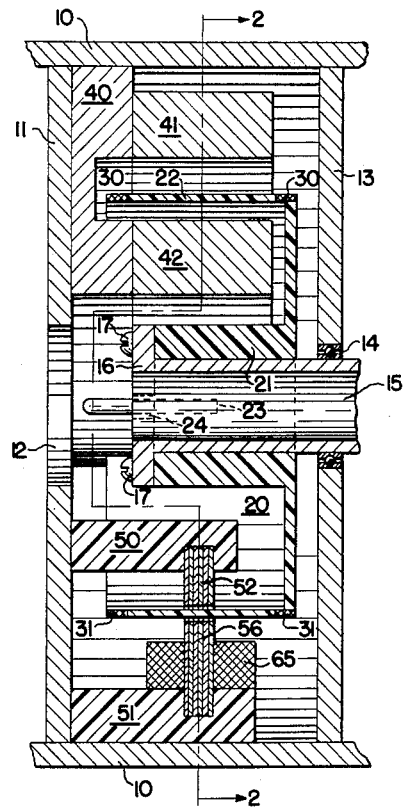
Figure 1 is a cross-section of the novel device.

Referring to Figure 1, there is provided a cylindrical housing 10, which may be the outside case or other member of a gyroscope. A disc-like support member 11 is attached to housing 10 (by means not shown) at right angles. The disc-like support 11 has a central opening 12 which is utilized to introduce electrical connection means (not shown) to the combined torquer and pick-off. Parallel to the support 11 is a second circular support 13. The circular support 13 is attached to the outer housing 10 in the same manner as is the circular support 11. In the center of the support 13 there is placed a bearing 14 and a shaft 15. The shaft 15 is journaled in the bearing 14 and in an additional bearing (not shown) which is located elsewhere along the axis of the shaft 15.

The shaft 15 has at its left edge a mounting flange 16. The mounting flange 16 has a group of three holes equally spaced around it which accommodate three mounting screws 17. The mounting screws 17 attach the flange 16 of shaft 15 to a cup-shaped rotor element 20. The rotor element 20 is preferably constructed of a molded plastic of any convenient type. The rotor 20 has a hub 21 and an outer rim 22 which are attached or molded as a single, integral unit. Cast into the hub 21 are a group of terminal pins 23. These terminal pins extend through flange 16 and are surrounded by an insulating sleeve 24. The insulating sleeve 24 completely isolates pin 23 from the shaft 15 and flange 16. The purpose of the isolated connecting pins 23 will become apparent subsequently.

Figure 3:
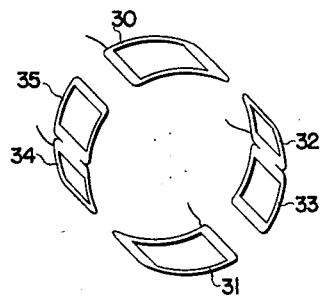
Figure 3 is an oblique pictorial view of the coils per se of the unit.
Figure 2:
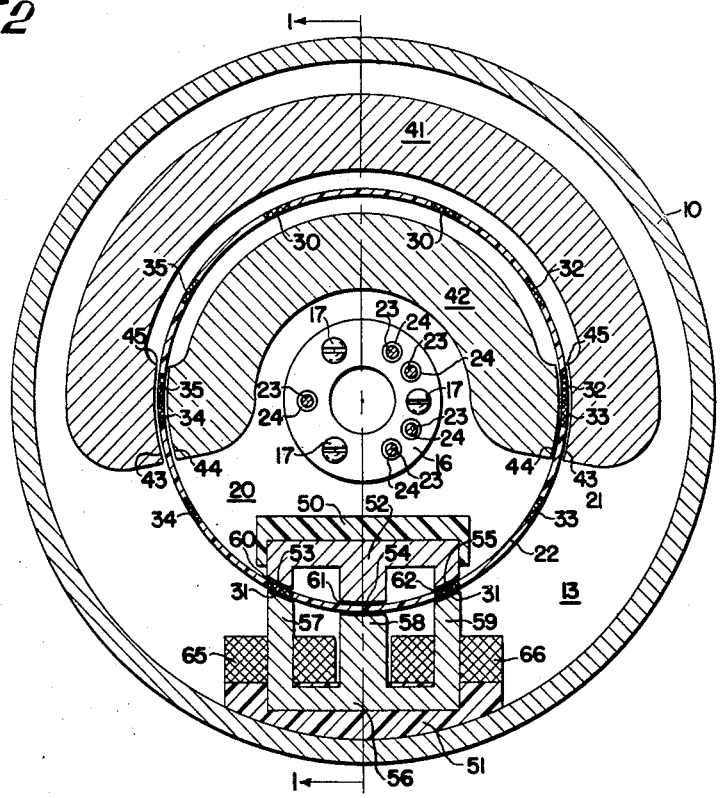
Figure 2 is a partial section of Figure 1 along lines 2—2.

The rim 22 of the cup-shaped member 20 forms a support means for a plurality of electrical coils. Coil 30 is a dummy coil used to mechanically balance the device. Coil 31 is utilized in the pick-off section of the device, and will be described in detail below. Coils 32, 33, 34 and 35 are interconnected to provide the torque generating means. The torque generating means will also be described in detail below. As can be seen in Figure 2 all of the coils 30–35 are embedded in the rim 22 of the cup support 20. In Figure 3 there is disclosed an oblique, pictorial view of the coils alone, and in Figure 4 there is a developed wiring diagram showing the interconnection of each of these coils. The function of the coils will be best understood when the overall structure has been completely described and their operation therefore will be discussed in more detail below.

Attached to support plate 11 is a non-magnetic spacer 40. The spacer 40 may be attached to the plate 11 by means such as screws (not shown). Attached to the spacing member 40 are two magnetic structures 41 and 42. Both members 41 and 42 are substantially C-shaped in form and either or both may be permanent magnets. The ends 43 of structure 41 and ends 44 of structure 42 define between them two similar air gaps 45. It will be noted that if either or both of the members 41 and 42 are permanent magnets that a strong concentration of magnetic flux will occur across the air gaps 45. Placed in the air gaps 45 is part of the rim 22 of the rotary cup member 20 and one edge of each of coils 32, 33, 34 and 35 also fall within the air gaps 45.

Figure 4:
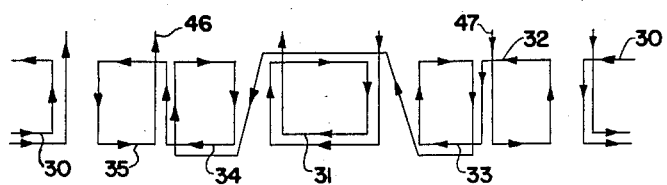
Figure 4 is a developed wiring diagram of the coils used in the unit.

From Figure 4 it can be seen that coils 32 and 33 are connected in series opposition and in turn connected in series with coils 34 and 35, which are also individually connected in series opposition. If this overall series circuit, that is, between leads 46 and 47 is energized with a direct current there will be flux established which will react with the flux in the air gaps 45 in such a manner as to cause rotation of the cup 20. The direction of rotation of the cup 20 will be a function of the polarity of energization of the series circuit between leads 46 and 47. It will thus be seen that a torque producing device capable of rotating either clock-wise or counter-clockwise has been developed. It will be further noted that the portions of the coils 32, 33, 34 and 35 which lie outside of the air gaps 45 will have little or no effect on the operation of the device. The terminal wires 46 and 47 are embedded in the hub 21 of the cup 20 and are attached to two pins 23. By means of pins 23 and the opening 12 of support plate 11, convenient connection may be made to the torque generating coils at or near the center of rotation of the cup 20. By this means little or no restraining torque is placed on the cup member 20 by the connection leads.

Two additional support members 50 and 51 are attached by any convenient means to support member 11. These two members, 50 and 51, in turn project parallel to the axis of rotation of the device but on opposite sides of the rim 22 of the cup 20. Both the support members 50 and 51 are attached diametrically opposite the center of the two C-shaped magnetic members 41 and 42. Supported by member 50 there is an E-shaped laminated structure 52 having poles 53, 54, and 55. The poles 53, 54 and 55 are of an appropriate length and curvature so that they lie adjacent the rim 22 of cup 20, on its inner side. Supported by member 51 is a second E-shaped laminated structure 56. The structure 56 has three legs 57, 58 and 59 which lie adjacent to the rim 22 of cup 20 but on its external side. The legs 53—55 and 57—59 define a plurality of air gaps 60, 61 and 62. The air gaps 60, 61 and 62 lie on the circumference of the rim 22 of cup 20 and define air gaps in line with the movement of the rim 22. Placed on legs 57 and 59 of the E-shaped member 56 are two coils 56 and 66. By energizing coils 65 and 66 equally, a balanced magnetic flux is established in legs 57, 58 and 59 of the pick-off device. The flux caused by the current in coil 65 and the flux caused by the current in coil 66 are in such relative directions that they cancel in the center leg 58. When coil 31 is exactly centered, then, with respect to air gaps 60 and 62, it will link, that is enclose, a zero net flux, so that no E.M.F. is induced in coil 31 in this condition. When the rim 22 of cup 20 is rotated under the action of the torque generating section, coil 31 is displaced within the air gaps 60 and 62. This causes coil 31 to link a net flux of an amount determined by the magnitude of the displacement. There is then an E.M.F. induced in coil 31, the magnitude of which is proportional to the net flux linkage, and is therefore dependent upon the amount of displacement. In addition, the sense of this induced E.M.F. depends upon the direction of displacement, for a displacement in one direction results in a net flux linkage opposite in sense to that caused by a displacement in the opposite direction. The E.M.F. in coil 31, then, indicates both the amount and the direction of the displacement of coil 31 from its centered or neutral position.

The individual action of the torque generating section and pick-off sections of this novel device are well understood by those versed in the art. As has been previously pointed out in the introduction, devices of this general nature have been utilized in the past, but the inter-connection means has been a bar shaped device. The bar shaped interconnecting unit, not being symmetrical about axes perpendicular to its axis of rotation, is subject to variations or extraneous torques due to most any form of acceleration to which the device may be subjected. It is further noted that if any changes in temperature occur the amount of expansion of the bar shaped unit could be unequal. Both of these faults are overcome by the use of the cup-shaped rotor member 20. The rotor device 20 is completely balanced and is symmetrical about axes perpendicular to the axes of rotation. It will thus be obvious that the acceleration of the overall unit has no effect on the accuracy of this device and also due to the symmetrical arrangement, any temperature changes which effect the unit cause expansion equally along all radii of the unit. It is clear that the novel device disclosed provides distinctive advantages over other devices known in the art, such as a combined torquer and pick-off utilizing a movable arm.

The arrangement disclosed in Figures 1–4 has been illustrative only of one preferred embodiment utilized in connection with gyroscopes. It will become obvious to those versed in the art that modifications could be made in the structure which would allow it to be utilized in numerous types of equipment. With this in mind the applicant wishes to be limited only by the appended claims.

I claim as my invention:

1. In a device of the class described: a rotatable cup-shaped coil support comprising a rim and a hub; torque generating means having the magnetic stator structure including two substantially C-shaped members in the same plane defining two air gaps therebetween; said generating means also including a plurality of coils held in said air gaps by the rim of said support means; inductive pick-off sensing means comprising a magnetic stator structure including two sections each having a plurality of legs and defining a plurality of air gaps therebetween; said pick-off means also including at least one coil held in said pick-off air gaps by the rim of the support means; and energizing means on at least one of said legs; said coils being rotated in their respective air gaps.

2. In a device of the class described: a rotatable cup-shaped coil support comprising a rim and a hub; torque generating means having a magnetic stator structure including two C-shaped members in the same plane defining two air gaps therebetween; said generating means also including a plurality of coils held in said air gaps by the rim of said support means; inductive pick-off sensing means comprising a magnetic stator structure including two E-shaped sections which define a plurality of air gaps therebetween; said pick-off means also including at least one coil held in said pick-off air gaps by the rim of the support means; and energizing means on the two outer legs of one of said E-shaped sections; said coils being rotated in their respective air gaps.

3. In a device of the class described: a rotatable cup-shaped coil support comprising a rim and a hub; torque generating means having a permanent magnet stator structure including two C-shaped members in the same plane defining two air gaps therebetween; said generating means also including a plurality of coils held in said air gap by the rim of said support means; inductive pick-off sensing means comprising a magnetic stator structure including two E-shaped sections which define a plurality of air gaps therebetween; said pick-off means also including at least one coil held in said pick-off air gaps by the rim of the support means; and energizing means on the two outer legs of one of said E-shaped sections; said coils being rotated simultaneously in their respective air gaps.

4. In a device of the class described: torque generating means and inductive pick-off sensing means each having separate stationary magnetic structures in substantially the same plane and separate moveable coil means; circular means mounting said coil means for simultaneous rotational movement with respect to the magnetic structures, the coil means of said torque generating means being diametrically opposed to each other; and dummy coil means substantially the mechanical equivalent of the coil means of said inductive pick-off sensing means, said dummy coil means being mounted on said circular means diametrically opposite the coil means of said inductive pick-off sensing means.

5. In a device of the class described: torque generating means and inductive pick-off sensing means each having separate stationary magnetic structures in substantially the same plane and separate moveable coil means; a rotatable cup shaped coil support mounting said coil means operatively for rotational movement with respect to the magnetic structures, the coil means of said torque generating means being mounted diametrically opposite each other; and dummy coil means substantially the mechanical equivalent of the coil means of said inductive pick-off sensing means, said dummy coil means being mounted on said coil support diametrically opposite the coil means of said inductive pick-off sensing means.

References Cited in the file of this patent

UNITED STATES PATENTS

| | | |
|---|---|---|
| 2,669,126 | Simmons | Feb. 16, 1954 |
| 2,756,357 | Schaberg | July 24, 1956 |

FOREIGN PATENTS

| | | |
|---|---|---|
| 736,219 | Great Britain | Sept. 7, 1955 |